United States Patent [19]

Pan

[11] Patent Number: 5,367,315

[45] Date of Patent: Nov. 22, 1994

[54] METHOD AND APPARATUS FOR CONTROLLING CURSOR MOVEMENT

[75] Inventor: Shaugan Pan, Iowa City, Iowa

[73] Assignee: Eyetech Corporation, Iowa City, Iowa

[21] Appl. No.: 613,385

[22] Filed: Nov. 15, 1990

[51] Int. Cl.⁵ .............................................. G09G 3/02
[52] U.S. Cl. ..................................... 345/156; 345/158; 345/7; 351/210
[58] Field of Search ............... 340/707, 708, 709, 706, 340/705; 351/210; 345/156, 158, 7

[56] References Cited

U.S. PATENT DOCUMENTS

| | | | |
|---|---|---|---|
| 4,109,145 | 8/1978 | Graf | 340/712 |
| 4,582,403 | 4/1986 | Weinblatt | 351/210 |
| 4,735,498 | 4/1988 | Uddén et al. | 351/210 |
| 4,950,069 | 8/1990 | Hutchinson | 351/210 |

FOREIGN PATENT DOCUMENTS 8601963  3/1986  Australia .............................. 351/210

Primary Examiner—Ulysses Weldon
Assistant Examiner—Matthew Luu
Attorney, Agent, or Firm—James C. Nemmers

[57] ABSTRACT

A microprocessor controlled infrared-light based system that indicates eye and head position in real-time, so as to enable a computer user to control cursor movement on a computer display by moving his or her eyes or head. By activating the system using a designated key on a standard keyboard or by using a foot operated switch, the user can, by moving the eyes and head, position the cursor at any point on the display in the same manner as the conventional mouse, thereby allowing use of presently available software and hardware.

9 Claims, 8 Drawing Sheets

METHOD AND APPARATUS FOR CONTROLLING CURSOR MOVEMENT

BACKGROUND OF THE INVENTION

In many computer systems, a cursor is the interface between the user and the computer when used for command executions, graphic displays, icon selection, menu choices, spreadsheets, word processing, video games, etc. Frequently, the cursor is controlled by keys on the keyboard allowing the cursor to be moved to the desired position.

There are, however, other types of cursor-control devices that are available and commonly used. One such device is referred to as a "mouse," which is moved by the user on a table or other flat surface. Movement of the mouse in a given direction on the table causes a corresponding movement of the cursor on the computer monitor or screen. The mouse has, however, a number of disadvantages. It requires the user to move one hand from the keyboard to move the mouse. Also, there must be available a sufficiently large, flat area over which the mouse can be moved. The requirement of constantly shifting a hand from the keyboard to the mouse decreases the operator's efficiency in word processing and spread sheet applications. Moreover, the conventional mouse cannot be used by persons with certain physical disabilities in their motor functions.

There are other cursor control devices such as light pens, joy sticks, track balls and thumb wheels. However, each of these devices also requires the user to continually shift one hand between the cursor control device and the keyboard. Moreover, some of these devices are somewhat difficult to master and they frequently take several hours of practice and training before a user can become efficient in their use. Also, all of these devices are practically useless with laptop and portable computers because of the additional space their use requires.

In an attempt to overcome the inherent disadvantages of the mouse and other cursor-control devices, there have been developed systems utilizing head movement to control the cursor. An example of this type of cursor-control device is shown in U.S. Pat. No. 4,682,159 in which a headset is worn by the user, which headset contains ultrasonic receivers that pick up sound waves transmitted by a ultrasonic transmitter in the vicinity of the computer display. The sound waves are compared for phase changes, which are converted into position change data used by the computer to control the cursor. However, this ultrasonic system requires a special headset to be worn by the user and requires sufficient power to operate the ultrasonic system. Also, the user must move his or her head to move the cursor; cursor movement cannot be accomplished by eye movement alone.

There has also been a considerable amount of research conducted using the reflection of light from the eye to detect eye movement and thus allow a person to use his or her eyes to make limited selections displayed on a screen. An example of the utilization of this type of technology is shown in U.S. Pat. No. 4,950,069. Systems of this type, however, require the head to be maintained in a fixed position, and they require special hardware and software which substantially increases the cost to a point where the systems have only limited use in specialized situations, such as for the handicapped. The technology employed in U.S. Pat. No. 4,950,069 is based upon considerable research that has been done in the area of recording methods for eye movement and image processing techniques. This research is summarized in two articles published in the periodical "Behavior Research Methods & Instrumentation": Vol. 7(5), pages 397-429 (1975) entitled "Methods & Designs—Survey of eye movement recording methods"; and Vol. 13(1), pages 20-24 entitled "An automated eye movement recording system for use with human infants". The basic research summarized in these articles is concerned with accurate eye movement measurement, and is not concerned about utilizing the eye movement to carry out any other functions. In all of these eye movement recording methods, the head must be kept perfectly still. This is a serious disadvantage for the normal user.

There is, therefore, a need for a cursor control method and system which does not require use of the hands.

There is a further need for a cursor control system that utilizes eye and/or head movement to control the position of the cursor but which does not require the user to maintain the head in a fixed position.

There is also a need for a cursor control system utilizing eye movement but which can be used to communicate with the present operating system of the computer in the same manner as a conventional mouse, thus allowing use of the system with all presently available software without any modification of existing hardware.

There is also a need for a system for controlling cursor movement utilizing eye and/or head movement, which system can be produced and marketed at a cost competitive with the conventional mouse.

The objects of the invention are to fulfill all of the foregoing needs.

SUMMARY OF THE INVENTION

The method and system of the invention utilizes infrared light transmitted into a defined area or sector within which the user's head will normally be located and moved about during operation of the computer. The user can freely move his or her head to any position within this defined area. Changes in the eye position of the user are determined by the amplitude of the infrared light reflected from the user's eyes and face and detected by multiple sensors positioned near the computer monitor. The signals detected by the sensors are compared to derive the moving direction of the eyes and head which information is then utilized to control the cursor movement. The system is activated by depressing and releasing a designated key on the keyboard or by a separate switch that can be activated by movement of another part of the user's body, such as a foot switch.

DESCRIPTION OF THE PREFERRED EMBODIMENT OF THE INVENTION

Figure 1:
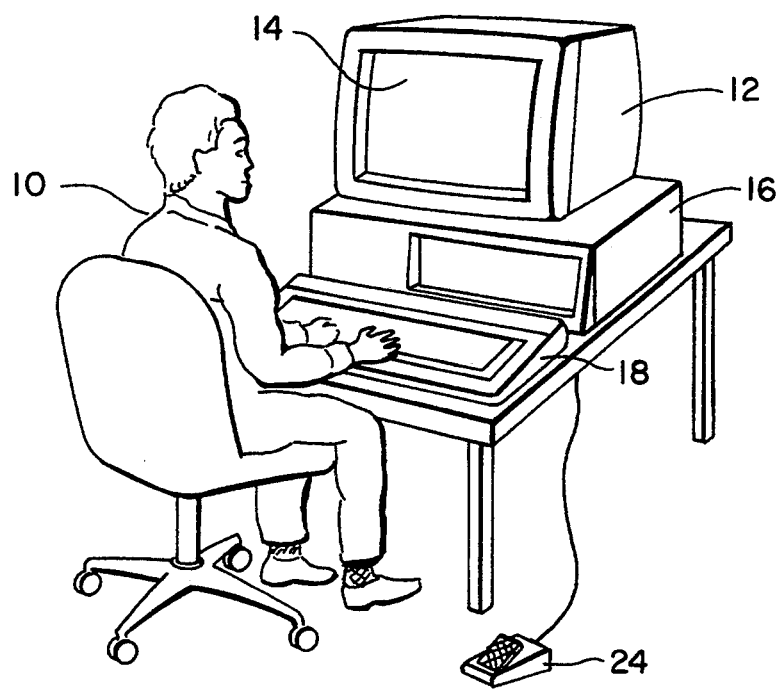
FIG. 1 is a view illustrating a user at a personal computer station.

Referring first to FIG. 1, there is shown an operator or user 10 seated in front of a computer monitor 12 having a screen 14. The host computer 16 includes a microprocessor that processes information entered into it by the user 10 through a keyboard 18 or other input device. All of these components illustrate a common computer work station which can be of many different designs and capacities to handle a wide variety of software. There is shown for purposes of illustration a personal computer, or "PC", which is commonly use in businesses, offices, classrooms and homes, and with increased power and capacity, can be used to process a wide variety of software. However, the principles of the invention are applicable to all types of computers. With increased availability of graphics programs, the keyboard 18 has been replaced or supplemented by the "mouse" as the favorite input device for graphic user interface. The keyboard is commonly used as an input device for word processing programs, which programs involve the editing phase of document preparation and extensive moving of the cursor to achieve such editing. Also, spread sheet applications depend upon the rate of use of cursor movement, and the keyboard 18 is not the most efficient device for cursor movement in these applications.

As previously noted, the cursor movement for graphics and other programs is more efficiently accomplished by use of a mouse. However, the user must remove his hand from the keyboard, find the mouse and move it properly, which requires the user to look back and forth from the screen to the mouse thus reducing the user's efficiency. Also, a conventional mouse takes up desk space, which may not always be readily available.

Figure 2:
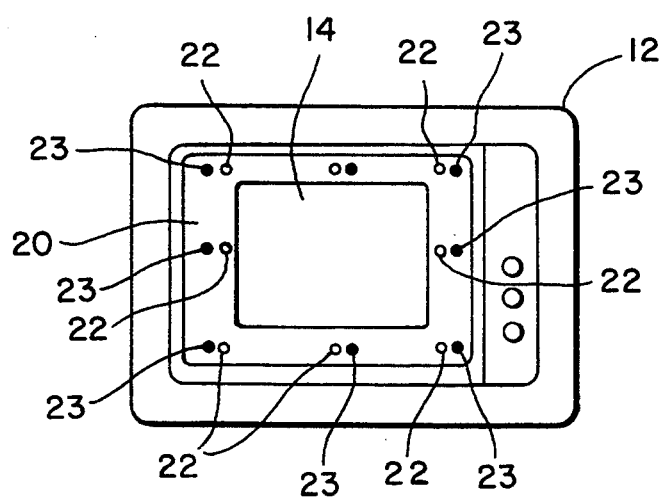
FIG. 2 is a front elevational view of a computer monitor and showing the sensor frame attached to the monitor.

The system of the invention eliminates the disadvantages of the conventional mouse while still utilizing the advantages of a supplementary input device for moving the cursor. In FIG. 2, there is illustrated a sensor frame 20. This is shown as being positioned around the screen 14. However, the sensor frame 20 or any other suitable support for multiple sensors may be located separately from the monitor 12 and remote from it as long as it is in a position to transmit and sense reflected light from the eyes and face of the user 10 in the manner described hereinafter. The sensor frame 20 supports a plurality of individual light transmitters 22 and light sensors 23. For purposes of illustration, eight of each of the light transmitters 22 and sensors 23 are shown as spaced around the sensor frame 20. As indicated in FIG. 2, there are three transmitters 22 and three sensors 23 on each side of the frame 20 as well as one centered on the top part of the frame and one on the bottom part of the frame 20. Although eight transmitters 22 and eight sensors 23 have been shown for purpose of illustration, the principles of the invention can be applied to a fewer or a greater number of transmitters and sensors depending upon the particular application as well as the software designed to function with the system.

Each light transmitter 22 generates pulses of light preferably in the infrared spectrum. Each sensor 23 also is capable of sensing any amount of infrared light directed to it. The infrared transmitters 22 are positioned so as to direct the infrared light throughout an area in front of the monitor 12 where the head of the user 10 will normally be positioned. This area of infrared illumination, which is also the area within which the sensors 23 can detect infrared light, is referred to herein as the "active area." For example, this active area may extend from approximately nine inches in front of the monitor 12 to approximately 36 inches away from the monitor 12, and also may encompass an area extending both above and below the top of the monitor 12 and slightly beyond both sides of the monitor 12. This would define an active area in which the head of the user 10 would normally be positioned and moved while operating the computer. When the transmitters 22 and sensors 23 are activated in the manner described hereinafter, the eye position of the user 10 is determined by infrared light reflected to the sensors 23. Each sensor 23 senses the intensity of the reflected infrared signal, thereby allowing comparison of the signals from the multiple sensors 23 to determine the relative position of the eyes of the user 10 based on the differences and the rate of change in the amplitude of the infrared signals received by the sensors 23. The infrared light reflected to each one of the sensors 23 is converted to a voltage value, which in turn is converted into a digital signal that is used by a microprocessor to determine the direction of movement of the eyes and head of the user 10. Determining the absolute position of the head and eyes of the user 10 is not necessary since the system of the invention will continuously determine the relative moving direction of the eyes and head, which information is used to control the cursor on the screen 14. This is all described more fully hereinafter.

Figure 3:
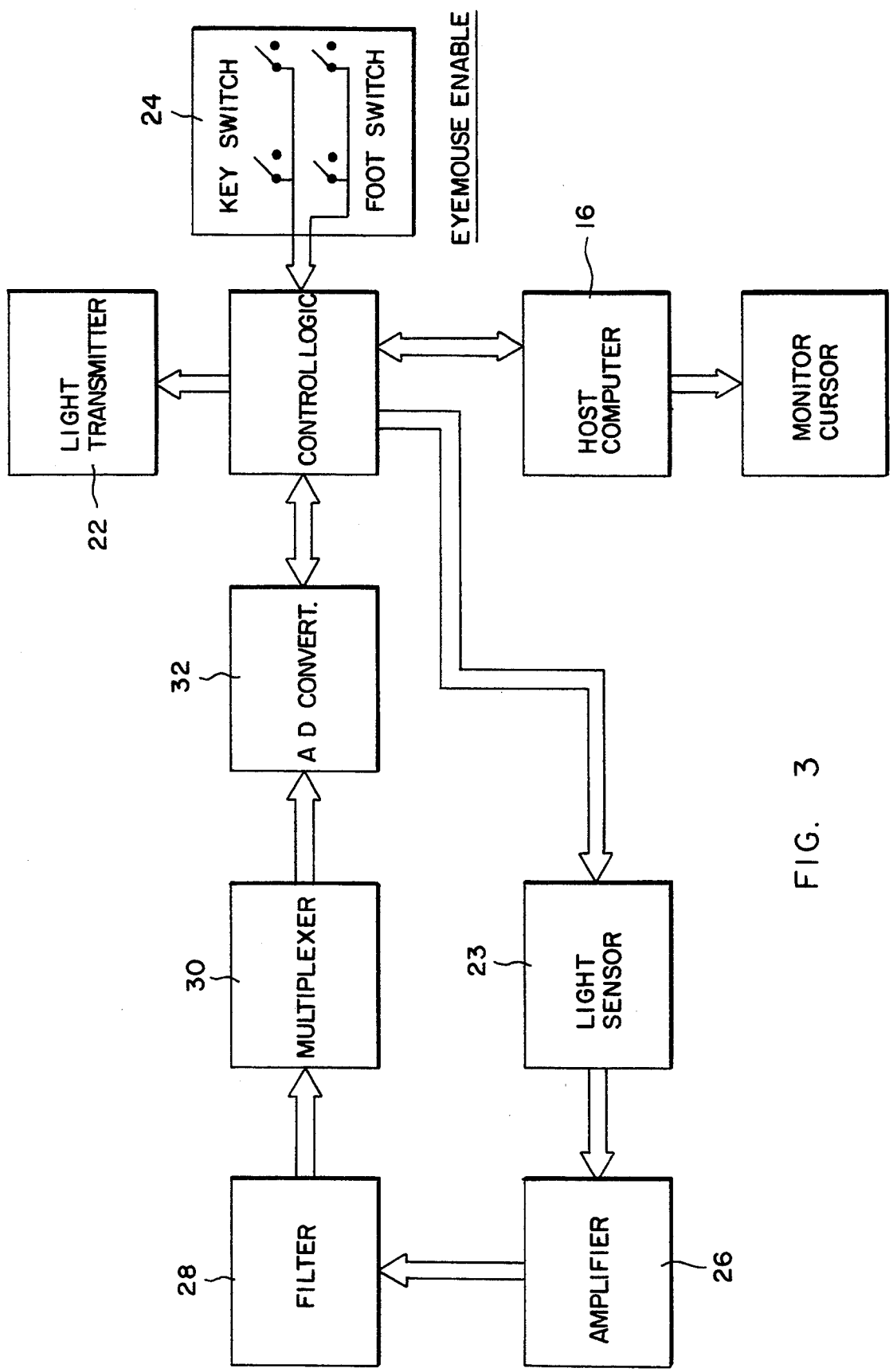
FIG. 3 is a schematic block diagram of the system of the invention.

To activate the system of the invention, the user 10 must first actuate a switch. This can be a switch on the keyboard 18, or it can be a foot switch 24 as illustrated in FIG. 1. Any type of normally-open switch of the depress/release type that can be easily user-actuated will suffice, and preferably the switch is one which does not require the user to remove a hand from the keyboard 18. For example, the switch 24 may be attached under the spacebar of the keyboard 18, and it may be a multiple key switch and foot or knee activated, depending upon the particular application. When activated, switch 24 performs three functions. It enables the system of the invention illustrated in FIG. 3. When the system is enabled by actuation of switch 24, infrared transmitters 22 will begin transmitting infrared light into the active area, and infrared light reflected back to a sensor 23 will produce a signal that is amplified by an amplifier 26 and filtered by filter 28 to remove noise created by surrounding light reflection. Since there are multiple sensors 23, the signals from them are selected in a multiplexer 30 after which the analog signals from the eight sensors 23 are converted sequentially to digital signals by an analog/digital convertor 32. These digital signals are then processed in a microprocessor 34 that contains a control logic controlled by the program written into its memory storage in the manner described hereinafter.

Figure 4:
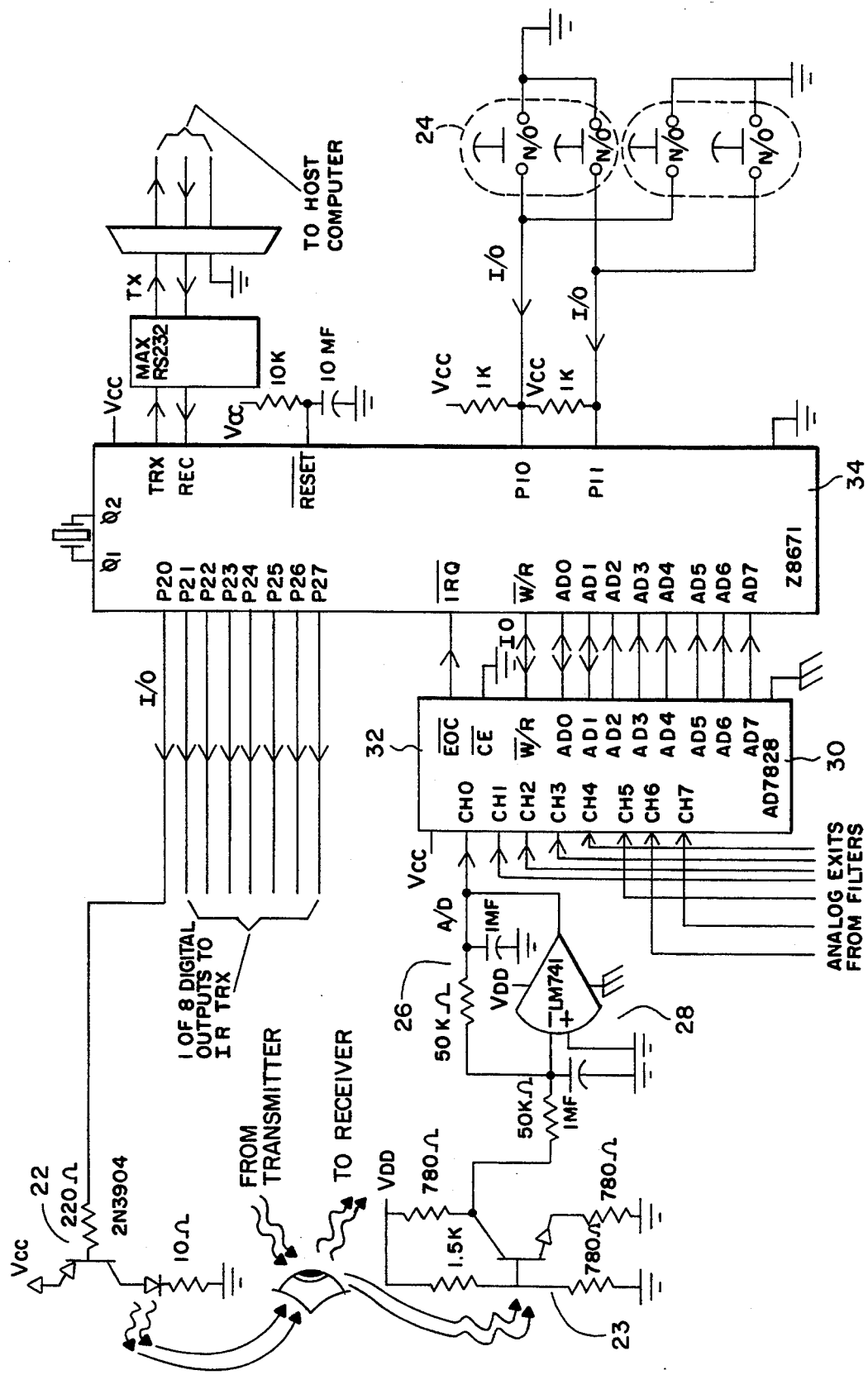
FIG. 4 is a circuit diagram illustrating the invention configured as an example specifically for connection to the serial port channel of the host computer.

In FIG. 4, there is illustrated an example of circuitry designed for controlling the cursor through the serial port channel of the host computer 16. The output on the microprocessor 34 is passed through an RS 232 interface driver so as to convert the signal from the microprocessor 34 to one that is acceptable for serial port communication.

Figure 5:
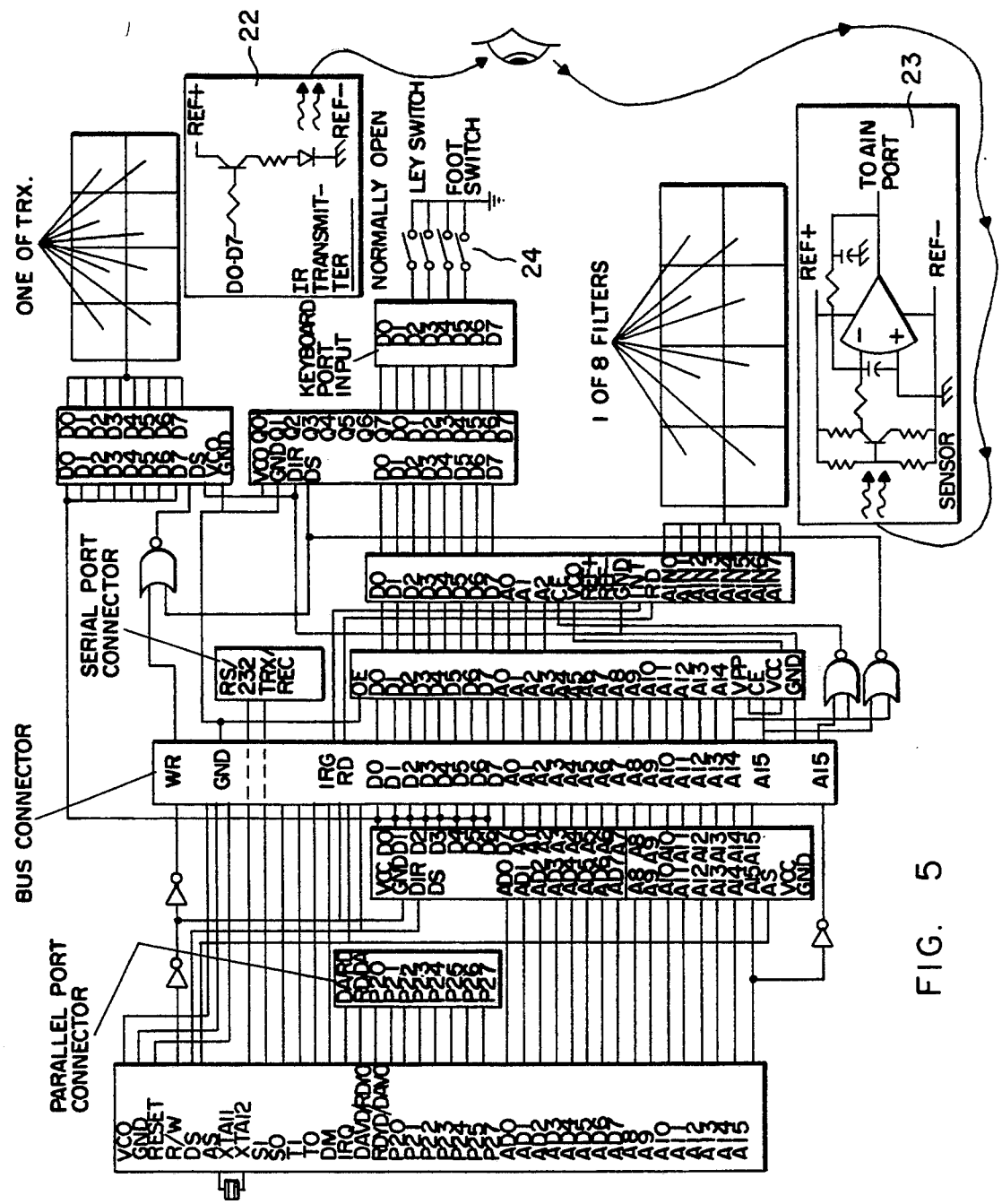
FIG. 5 is a circuit design incorporating the principles of the invention and showing all three possible connections to the host computer.

FIG. 5 illustrates a circuit design which will permit the microprocessor 34 to be used and connected either to the serial or parallel port channels of the host computer 16 or the data bus of the host computer 16. The specific circuitry of FIG. 5 as it relates to the invention is similar to that of FIG. 4, which shows a circuit design or connection to the serial port channel of the host computer 16.

As previously indicated, the transmitters 22 and sensors 23 are activated by depressing and releasing the switch 24. The depression and immediate release of the switch 24 is referred to as a "click". The switch 24 is utilized to perform three basic functions. First, when the switch 24 is clicked once, the infrared transmitters 22 will begin transmitting pulsed infrared light into the active area, and the sensors 23 will begin detecting light reflected from the eyes and face of the user 10. With his or her head position within the active area, user 10 then focuses his or her eyes on the point on the screen 14 where the user would like the cursor to be. The user can either scroll or scan across the screen with the eyes, and when the cursor reaches the desired position the switch 24 is clicked once to "login" (lock in) the cursor at the chosen position. This procedure can be used to select menu items of a program displayed on the screen 14 or it can be used in word processing applications to move the cursor to a desired location for editing, etc. This basic function I have termed the "enable/login" function.

If the user 10 wishes to move an icon or object across the screen 14, the switch 24 is clicked once to activate the transmitters 22 and sensors 23. The user 10 moves the cursor to the desired position under the object to be moved using the eyes and/or head. Then, with the switch 24 depressed and held closed, the object under the cursor will be picked up and will follow the eye movement across the screen, and when the object is placed at the desired position, the user 10 simply releases the switch 24. This second basic function is termed "drag", which is the motion of moving an object across the screen.

If a specific program is to be run, the user 10 again activates the transmitters 22 and sensors 23 and the microprocessor 34 by clicking the switch 24 and then focusing his or her eyes on the chosen program name or icon. To issue a command to run the program or open the icon, user 10 then clicks switch 24 twice in rapid succession. The time period between the key strokes (clicks) may be programmed into the software. This third basic function is termed the "run" or "launch" function.

To carry out the foregoing functions which permit movement of the eyes of the user 10 to control movement of the cursor, the microprocessor 34 is controlled by the program written into its memory storage or EPROM, which program I have called "Sub." Also, inside the host computer 16 there is another program, which I will call "Host," which controls the microprocessor inside the host computer 16. The microprocessor of the host computer 16 and the microprocessor 34 communicate through these programs to obtain the information from the foot switch 24 and the data from the sensors 23 so as to place the cursor at the desired position on the screen 14 and then execute the necessary operations as commanded by the user 10.

Figure 6:
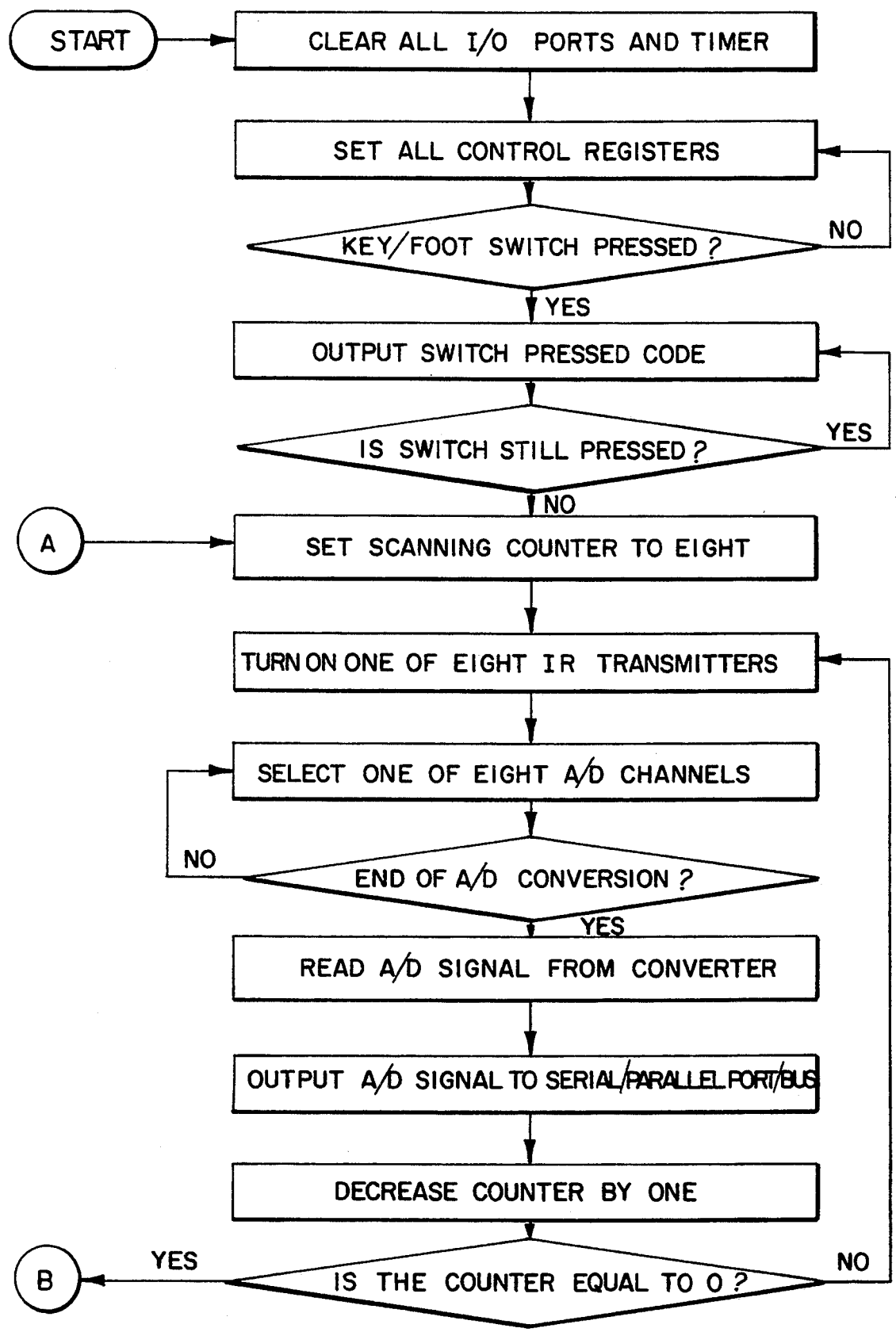
FIG. 6 is a flow chart representing the main program of the microprocessor used to carry out the principles of the invention.

FIG. 6 is a flow chart of the Sub program that controls the microprocessor 34. At the start, initialization occurs to clear all I/O ports, set all control registers and the interrupt timer and prepare the microprocessor 34 for operation. If the switch 24 is pressed, the internal timer of the microprocessor 34 is started so it is decreased from a number which represents the number of the sensors 23. If the switch 24 is pressed, the code thus produced it outputed to the host computer 16 via either by serial port or parallel port or the computer data bus depending upon the specific connection used. If the key is released, the scanning counter is set to 8 (the number of sensors 23) so that the eight analog to digital channels will be scanned sequentially. One of the eight infrared transmitters 22 is then turned on, and one of the eight analog to digital channels is selected. If the "end of conversion" signal has been received, one of the analog to digital signals from the converter 32 is read in and outputed to the host computer 16 through the serial or parallel port channel or the data bus, as the case may be. The counter is also then decreased by one. If the counter is not equal to zero, another of the eight infrared transmitters 22 is turned on and the foregoing described steps are repeated until the counter is equal to zero. At this time, if the switch 24 is still pressed, the key pressed code is outputed to the host computer 16.

Figure 7:
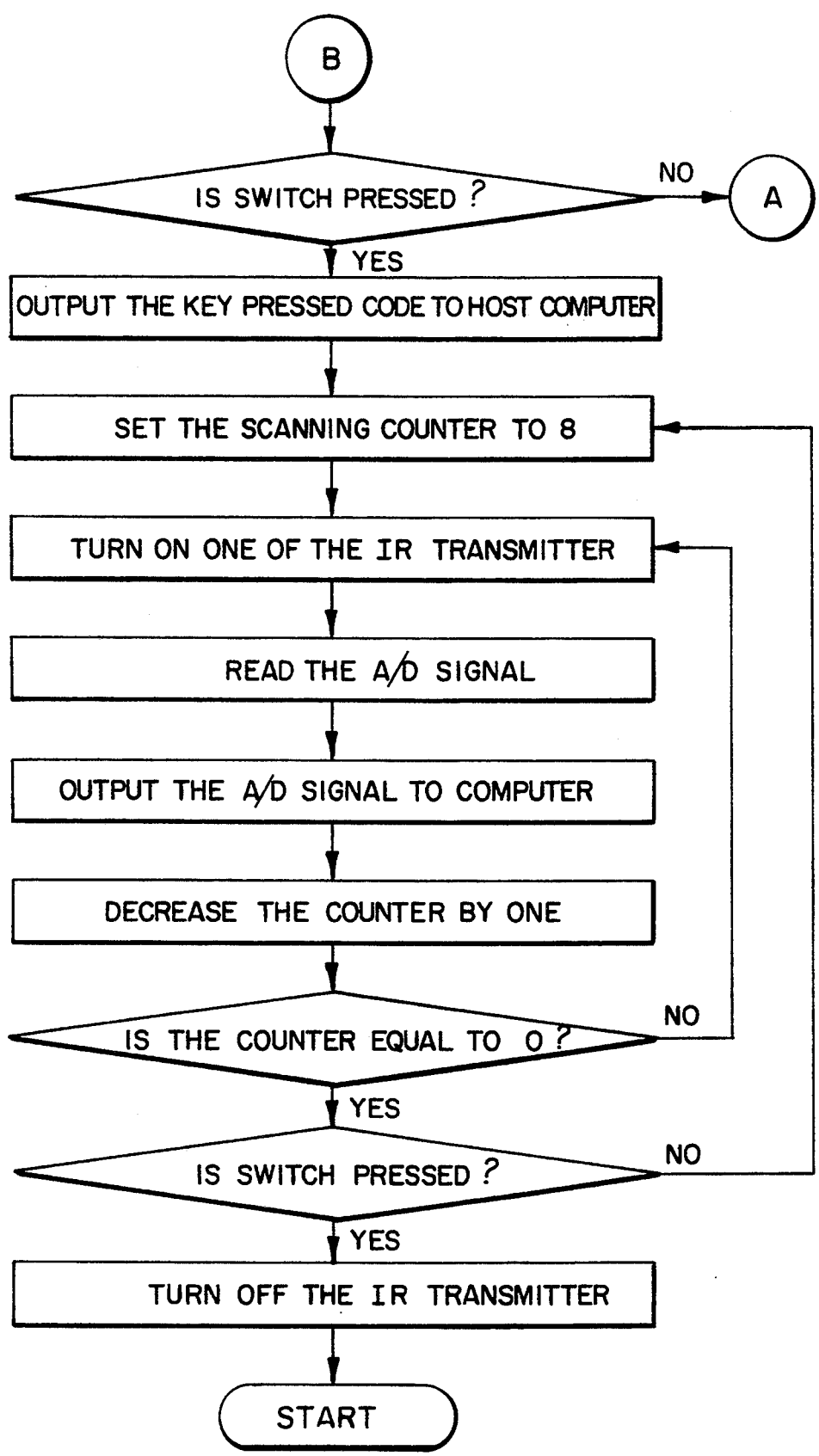
FIG. 7 is a flow chart also representing a continuation of the main program of the invention shown in FIG. 6.

As indicated on FIG. 7, which is a continuation of the flow chart of FIG. 6, if the switch 24 is not pressed, the sequence of operations is returned to step "A" as shown on FIG. 6. Assuming that switch 24 is pressed, the scanning counter in the microprocessor 34 is set to 8 so that the eight analog to digital channels will be scanned sequentially and another of the eight infrared transmitters 22 will be turned on, and the audio to digital signal produced by a sensor 23 will be read and the signal outputed to the host computer 16, if the end of conversion signal has been received. The counter is then again decreased by one, and if the counter is now equal to zero and the switch 24 is pressed, the transmitters 22 are turned off and the program is returned to start.

Figure 9:
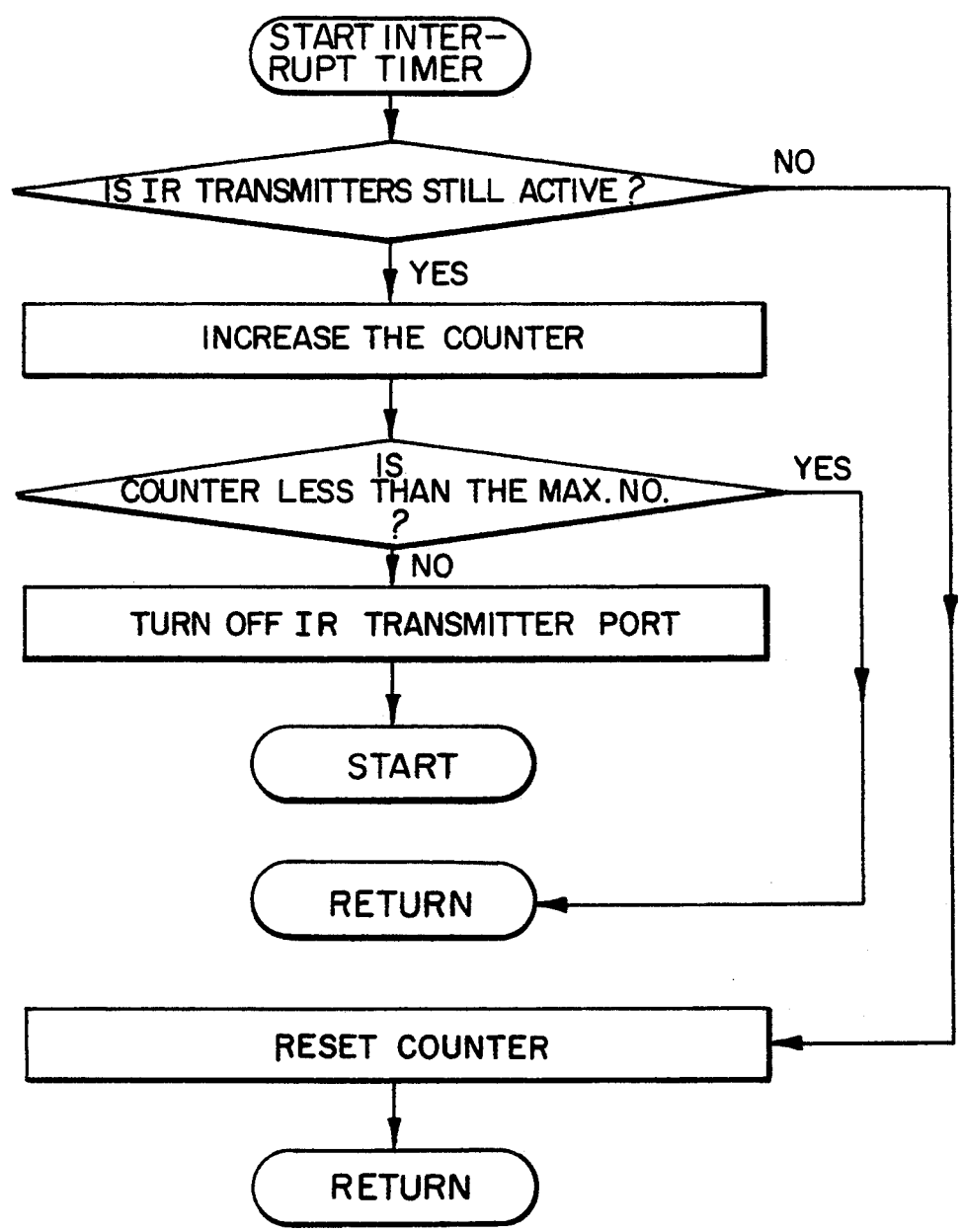
FIG. 9 is a flow chart representing the interrupt subroutine inside the microprocessor of the invention.

The program also contains an interrupt subroutine in the event that the user 10 enables the system and then does nothing for a predetermined period of time. After this predetermined period of time, it is assumed that the user 10 does not wish to continue the operation and thus, the transmitters 22 and sensors 23 will be turned off. When the interrupt request is applied by the timer of the microprocessor 34, it triggers the execution of the following interrupt subroutine, which is illustrated in the flow chart of FIG. 9. When the interrupt timer is started, and if the infrared transmitters 22 are not still active, then the counter is reset and the sequence is returned to the start of the Sub program of the microprocessor 34, which is illustrated in FIGS. 6 and 7. However, if the infrared transmitters 22 are still active, the counter is increased, and if the counter is still less than the specified maximum of 8, return is made to the Sub program. However, if the counter is at the specific maximum of 8, the infrared transmitter port is turned off and we go to the "start" point of the Sub program of FIG. 6.

Figure 8:
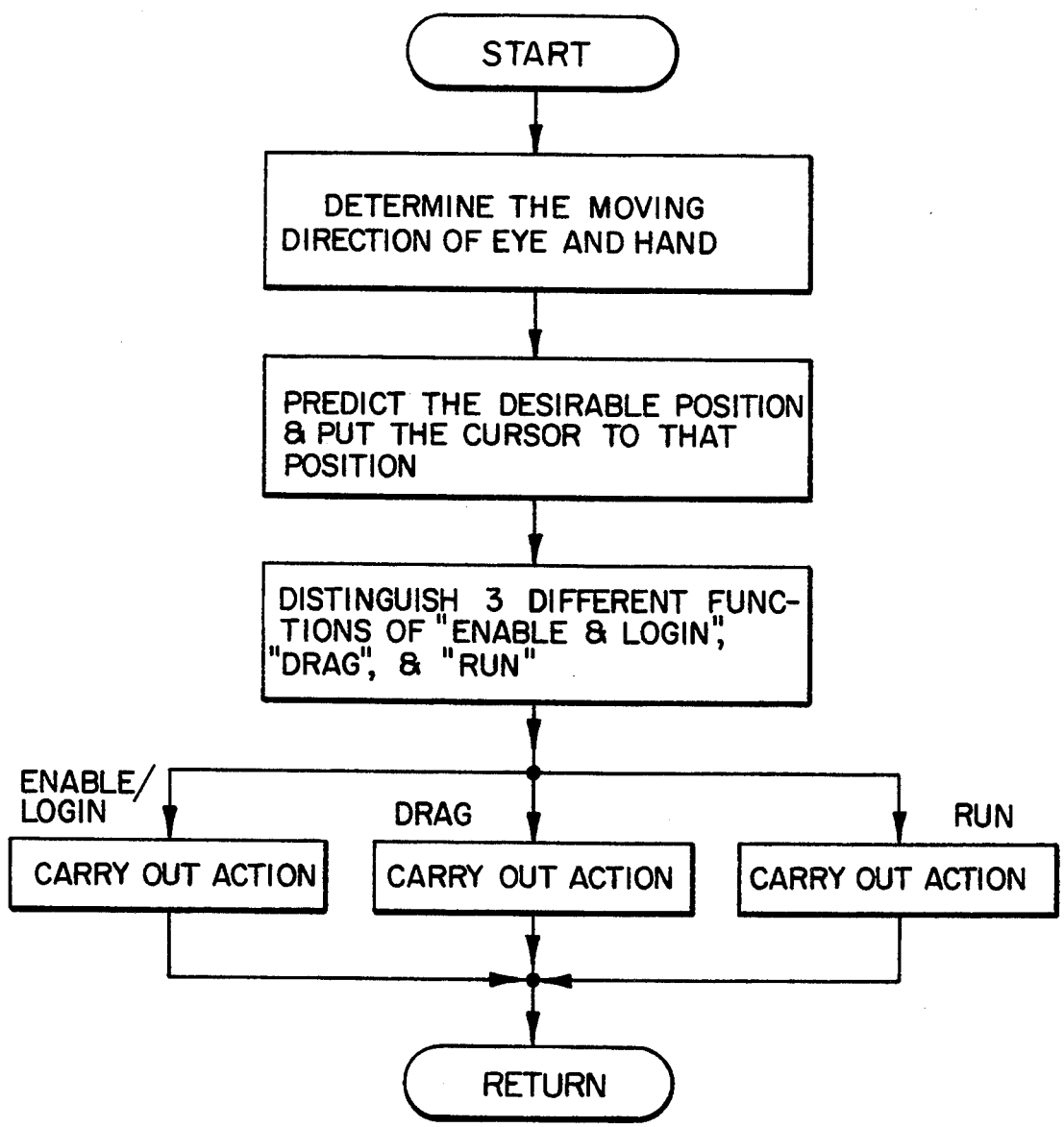
FIG. 8 is a flow chart representing the interrupt subroutine inside the host computer.

As illustrated in FIG. 8, the host program inside the host computer 16 receives the signals from the microprocessor 34 as just described, calculates and predicts the moving direction of the user's head and eyes and then positions the cursor on the screen. Signals coming from the microprocessor 34 through either the serial or parallel port channels or the data bus cause the application of the interrupt request and execution of the program of the interrupt subroutine illustrated in FIG. 9. Based on the information received from the microprocessor 34, the Host program inside the host computer 16 compares the data received and determines the moving direction of the head and eyes of the user 10. Depending upon the amount of head and eye movement and how rapid the change is, the cursor will be placed at the desired position. Then, based on the code received from the microprocessor 34 produced by actuation of the switch 24, and combined with the information received from the sensors 22, one of the three basic functions are carried out. As previously described, these are the enable/login, drag or run functions. When the functions are carried out, there is a return to the particular software currently running inside the host computer 16.

From the foregoing description, it is evident that the eye position of user 10 can be determined by the reflected infrared signal amplitude of the sensors 23 so as to determine the relative moving direction of the eyes and head and the user 10. By comparing the relative amplitudes and rate of changes of the signals received by sensors 23, data can be produced to control cursor movement. The user 10 is free to move his or her head to any position within the active area in front of the screen 14, and the user 10 is not required to wear any special headgear or other hardware. The apparatus and method of the invention thus takes the place of the conventional mouse or input pointing device, and allows the user 10 to use his or her eyes to position the cursor on the screen 14. This is done without moving the hands from the keyboard, it being only necessary to activate the switch 24 by the foot or knee or other keyboard switch in order to activate the system of the invention and permit the eyes to be used to control the cursor. It will be further evident that this permits the eyes to be used to control cursor movement in conjunction with any software, whether that be graphic displays, icon selection, menu choices, spread sheet, word processing, video games, etc. The system of the invention thus communicates with the operating systems of existing software in the same manner as the conventional mouse. Because of this, use of the system of the invention is faster, more natural and easier to use than any other form of cursor control, thus opening a uniquely new communication channel between the human eye and the computer. This can be accomplished at a minimal cost competitive with conventional mouse technology. The system of the invention has obvious advantages for use by the physically disabled, and will open up an entirely new area of communications for the disabled. Severely disabled people who can communicate only with their eyes will now be able to communicate in many more ways through the use of existing software and hardware. Moreover, the system of the invention has obvious advantages when used with laptop and portable computers. The conventional mouse devices are awkward to use with such computers because of space limitations. The use of the system of the invention makes laptops and portables more usable under conditions never thought possible.

Having thus described the invention in connection with the preferred embodiment thereof, it will be evident to those skilled in the art that various revisions and modifications can be made to the preferred embodiment disclosed herein without departing from the spirit and scope of the invention. It is my intention, however, that all such revisions and modifications that are obvious to those skilled in the art will be included in the scope of the following claims.

What is claimed is as follows:

1. A method for controlling the movement of a cursor on a computer display in response to corresponding movement of a user's head and eyes, said method comprising: causing light at frequencies within the infrared spectrum to be generated and transmitted from one or more light sources throughout a relatively large defined active area within which the user's head is normally positioned and moved during operation of the computer; providing one or more non-imaging detectors capable of measuring the intensity of the infrared light reflected thereto from the user's head and eyes from anywhere within the defined area so as to produce signals from the detectors, the amplitude of each signal corresponding to the intensity of the infrared light reflected to each detector; comparing the amplitude of the signals received by the detectors so as to determine the relative position of the head of the user within the defined area based upon the differences and the rate of change in the amplitude of each of the signals; and using the information from the comparison to control movement of the cursor to a position on the computer display that corresponds to the position of the user's head within the defined active area.

2. The method of claim 1 further comprising the steps of: actuating a switch to cause infrared light to be generated, transmitted and sensed, and again actuating the switch to lock the position of the cursor at a selected location on the computer display after movement to the selected location.

3. An apparatus for controlling the movement of a cursor on a computer display in response to corresponding movement of a user's head and eyes, said apparatus comprising: one or more light means for generating and transmitting light at frequencies within the infrared spectrum throughout a relatively large defined active area within which the user's head is normally positioned and moved during operation of the computer; one or more non-imaging detectors capable of measuring the intensity of the infrared light reflected thereto from the user's eyes and head from anywhere within the defined area; means for producing a signal from each detector which signal corresponds to the intensity of the infrared light measured by the detector at a particular time; comparative means for comparing the signals from the detectors at a given time and repeatedly comparing the signals to derive the relative position of the head of the user within the defined area based upon the differences and rate of change in the amplitude of each of the signals so as to produce data; and means for utilizing the data to produce movement of the cursor corresponding to movement of the user's head within the defined active area.

4. The apparatus of claim 3 further comprising user controlled switch means for activating the light means and the detectors, the switch means also functioning when again actuated to lock the position of the cursor at a selected location on the computer display.

5. The apparatus of claim 4 in which the light means and detectors are positioned on a separate component located in close proximity to the computer display.

6. The apparatus of claim 4 in which there are a plurality of light means and a plurality of detectors all of which are positioned around the computer display.

7. The apparatus of claim 5 in which the switch means is foot operated.

8. The apparatus of claim 5 in which the switch means is a part of the standard keyboard for a computer.

9. The apparatus of claim 3 in which the means for utilizing the data produced by comparing the signals includes a microprocessor that produces an output acceptable for communication with the serial or parallel port or bus connector of a computer.

* * * * *